US011204075B2

(12) United States Patent
Juracek et al.

(10) Patent No.: US 11,204,075 B2
(45) Date of Patent: Dec. 21, 2021

(54) FREE-FLOATING WASHER FOR REBOUND DAMPING

(71) Applicant: Textron Aviation Inc., Wichita, KS (US)

(72) Inventors: Gayle Juracek, Wichita, KS (US); Ryan Culp, Sedgwick, KS (US); Justin Birkey, Wichita, KS (US)

(73) Assignee: Textron Innovations, Inc., Providence, RI (US)

(*) Notice: Subject to any disclaimer, the term of this patent is extended or adjusted under 35 U.S.C. 154(b) by 20 days.

(21) Appl. No.: 16/379,050

(22) Filed: Apr. 9, 2019

(65) Prior Publication Data

US 2019/0309817 A1 Oct. 10, 2019

Related U.S. Application Data

(60) Provisional application No. 62/655,267, filed on Apr. 10, 2018.

(51) Int. Cl.
*F16F 9/34* (2006.01)
*F16F 9/348* (2006.01)
*B64C 25/60* (2006.01)
*F16F 9/516* (2006.01)
*F16F 9/18* (2006.01)

(52) U.S. Cl.
CPC ............ *F16F 9/3485* (2013.01); *B64C 25/60* (2013.01); *F16F 9/185* (2013.01); *F16F 9/516* (2013.01); *F16F 2232/08* (2013.01); *F16F 2234/02* (2013.01)

(58) Field of Classification Search
CPC ............ F16F 9/062; F16F 9/486; F16F 9/516
See application file for complete search history.

(56) References Cited

U.S. PATENT DOCUMENTS

| 2,146,089 | A | * | 2/1939 | Onions | ................... | B64C 25/60 267/64.15 |
| 2,343,478 | A | * | 3/1944 | Rossman | ................... | F16F 9/34 188/282.9 |
| 2,599,831 | A | * | 6/1952 | Hoare | ................... | B64C 25/60 267/64.15 |
| 2,642,278 | A | * | 6/1953 | Westcott, Jr. | ........... | B64C 25/60 267/64.15 |

(Continued)

FOREIGN PATENT DOCUMENTS

FR 2469618 11/1979

*Primary Examiner* — Bradley T King
(74) *Attorney, Agent, or Firm* — Erise IP, P.A.

(57) ABSTRACT

An oleo strut includes an outer cylinder forming a first fluid chamber and an inner cylinder forming a second fluid chamber. The inner cylinder is adapted for sliding concentrically within the outer cylinder in a longitudinal direction. An orifice plate, which is located within the inner cylinder, has holes for fluidly coupling the first fluid chamber with the second fluid chamber. A free-floating washer is constrained in a slot of the orifice plate adjacent the holes and is adapted to move in the longitudinal direction for alternatively blocking and unblocking at least a portion of the holes. During compression of the oleo strut, fluid pushes the washer away from the holes for reducing resistance to fluid flow. During extension of the oleo strut, fluid pushes the washer against the orifice plate covering at least a portion of the holes, which increases the damping force and reduces the extension speed.

17 Claims, 4 Drawing Sheets

(56) References Cited

U.S. PATENT DOCUMENTS

| | | | | |
|---|---|---|---|---|
| 2,724,590 A | * | 11/1955 | Irwin | F16F 9/486 |
| | | | | 267/64.22 |
| 3,003,595 A | * | 10/1961 | Patriquin | F16F 9/486 |
| | | | | 188/287 |
| 3,006,628 A | * | 10/1961 | Utting | B64C 25/60 |
| | | | | 267/64.28 |
| 3,147,826 A | * | 9/1964 | McHenry | B60G 15/12 |
| | | | | 188/282.1 |
| 3,216,535 A | * | 11/1965 | Schultze | F16F 9/49 |
| | | | | 188/282.1 |
| 3,556,268 A | | 1/1971 | Fister et al. | |
| 4,787,486 A | * | 11/1988 | Hrusch | B64C 25/60 |
| | | | | 188/289 |
| 5,074,250 A | | 12/1991 | Clark, IV | |
| 8,925,697 B2 | | 1/2015 | Eroshenko | |

\* cited by examiner

FREE-FLOATING WASHER FOR REBOUND DAMPING

CROSS-REFERENCE TO RELATED APPLICATIONS

This application claims the benefit of U.S. Provisional Patent Application Ser. No. 62/655,267, entitled Free-Floating Washer for Rebound Damping and filed Apr. 10, 2018, the disclosure of which is herein incorporated by reference in its entirety.

BACKGROUND

1. Field of the Disclosure

Embodiments of this disclosure relate generally to hydraulic devices and more specifically to rebound damping in landing gears.

2. Description of the Related Art

Shock absorbers found in the prior art use a variety of means for controlling fluid flow between chambers of a shock absorber. For example, U.S. Pat. No. 8,925,697 to Eroshenko discloses a shock absorber having check valves in the form of washers having calibrated orifices that bear against a corresponding head. U.S. Pat. No. 3,556,268 to Fister et al. discloses a hydraulic shock absorber having different orifice sizes and different patterns of orifices along the length of a working cylinder for varying the rate of hydraulic fluid transfer depending on the compression position of the shock absorber. French Patent Publication No. 2,469,618 to Bourcier de Carbon discloses a piston for a shock absorber having perforated plates for controlling flow of oil between chambers. U.S. Pat. No. 5,074,250 to Clark discloses a watering device having a valve body with a free-floating washer that abuts an upper moveable member of a valve for controlling the rate of water flow through the valve.

SUMMARY

In an embodiment, a rebound damping system for an oleo strut includes an outer cylinder forming a first fluid chamber and an inner cylinder forming a second fluid chamber. The inner cylinder is adapted for sliding concentrically within the outer cylinder in a longitudinal direction. An orifice plate is located within the inner cylinder and arranged in a transverse direction perpendicular with the longitudinal direction. The orifice plate provides a fluid path for fluidly coupling the first fluid chamber with the second fluid chamber. A free-floating washer is positioned adjacent the orifice plate. During extension of the oleo strut, fluid flow pushes the free-floating washer against the orifice plate, which covers a portion of the fluid path to prevent fluid flow for increased damping. During compression of the oleo strut, fluid pushes the free-floating washer away from the orifice plate allowing fluid flow through the fluid path.

In another embodiment, an oleo strut having a free-floating washer for rebound damping is provided. The oleo strut includes an outer cylinder forming a first fluid chamber and mechanically coupled to an airframe of an aircraft, and an inner cylinder forming a second fluid chamber. The inner cylinder is adapted for sliding concentrically within the outer cylinder in a longitudinal direction. The oleo strut further includes an orifice plate located within the inner cylinder and arranged in a transverse direction. The orifice plate has a plurality of holes for fluidly coupling the first fluid chamber with the second fluid chamber. The free-floating washer is positioned adjacent the orifice plate for partially covering the plurality of holes due to fluid flow when the oleo strut is extending.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

As an oleo strut or shock absorber compresses or extends, a fluid is forced to flow between chambers. Resistance to the flow provides a damping force and control of the flow may be used to control the rate of oleo strut compression and extension. Oleo struts are commonly used on aircraft landing gear. Prior to landing of the aircraft, the oleo strut is unweighted and in a fully extended position. As wheels of the landing gear touchdown, the oleo strut undergoes compression as the aircraft's weight and downward momentum are absorbed. After landing, the oleo strut undergoes partial extension since it supports the aircraft's weight but no longer resists any downward momentum. After liftoff, the wheels are unweighted, and the oleo strut returns to full extension.

Embodiments of the present disclosure provide a free-floating washer for affecting fluid flow by covering orifices between chambers of a piston (e.g., in an oleo strut or shock absorber). The washer abuts an orifice plate when fluid flows in one direction but not in the opposite direction. The arrangement of the washer and orifices provides rebound damping having additional damping force during extension, to reduce the extension speed of landing gear with a low risk of latent failure. Use of a free-floating washer avoids the need to use a spring or elastomer, both of which are subject to latent failure and may wear out after repeated use. The flow area and flow characteristics through the orifices are modified based on a position of the floating washer.

Figure 1:
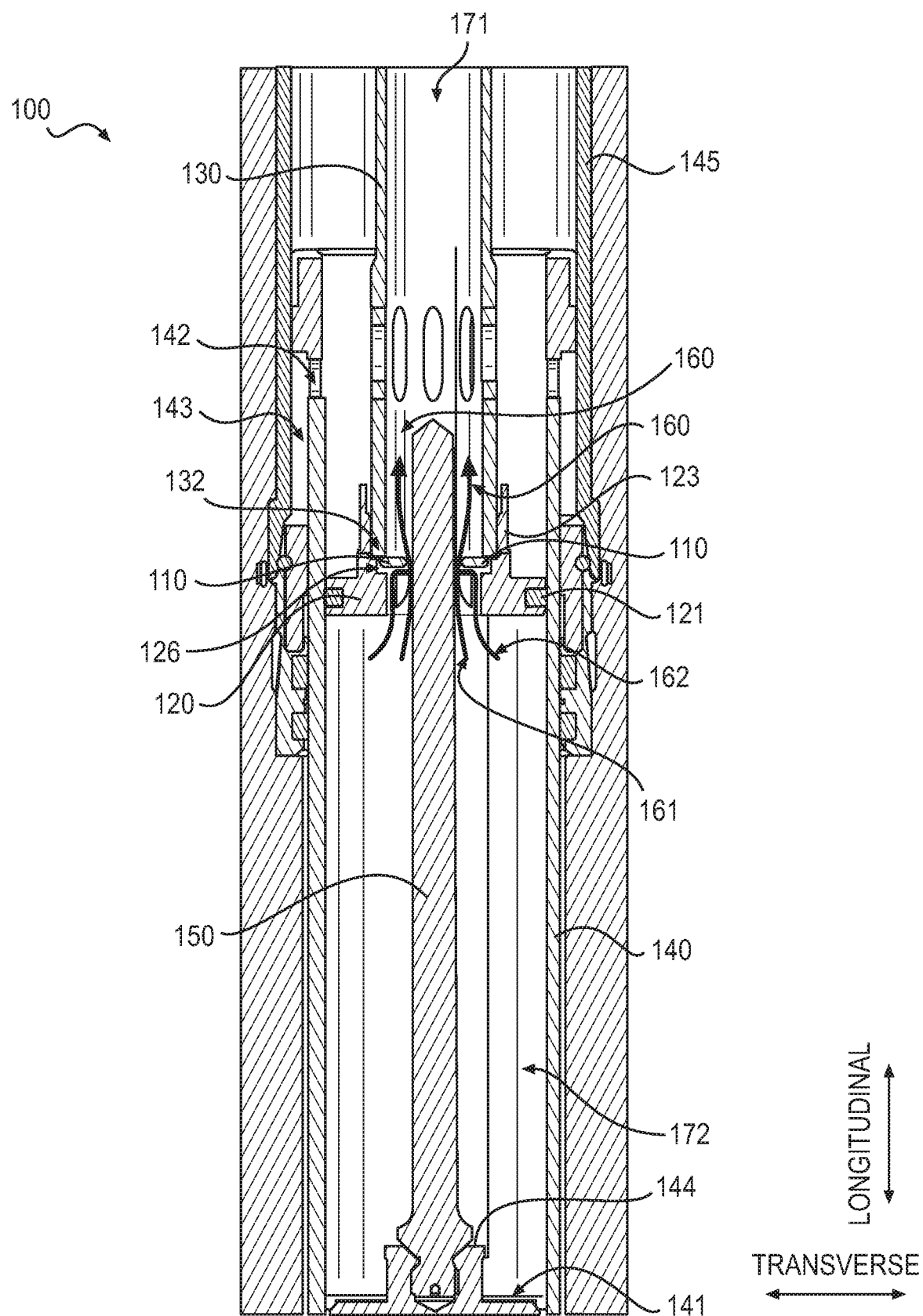
FIG. 1 is a cross-sectional side view along a mid-section of an oleo strut having a free-floating washer during compression of the oleo strut, in an embodiment.
Figure 2:
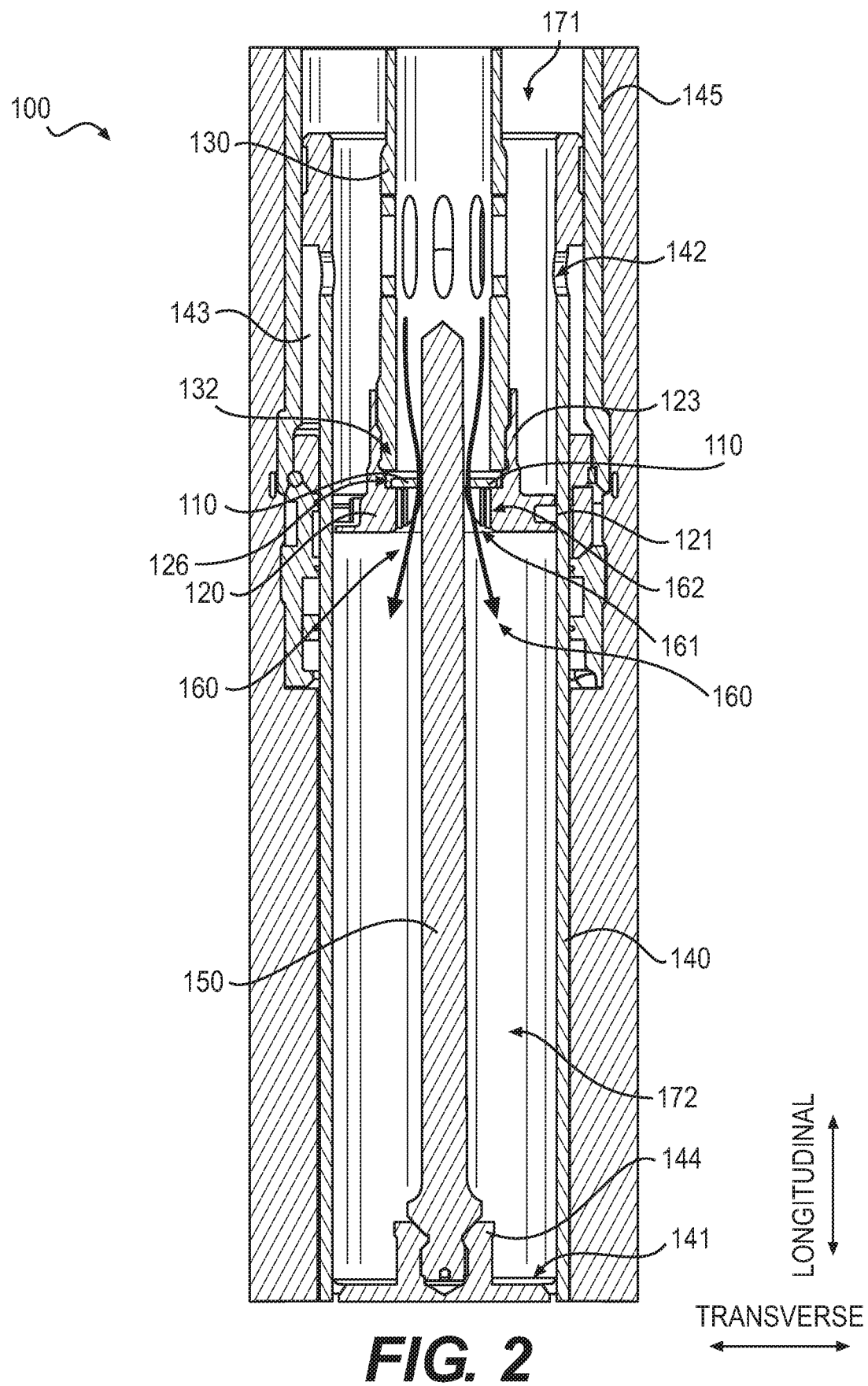
FIG. 2 is a cross-sectional side view along a mid-section of the oleo strut of FIG. 1 having a free-floating washer for rebound damping during extension of the oleo strut.

FIG. 1 is a cross-sectional side view along a mid-section of an exemplary oleo strut 100 having a free-floating washer 110 for rebound damping. FIG. 1 shows oleo strut 100 during compression, while FIG. 2 shows oleo strut 100 during extension. Oleo strut 100 is for example a pneumatic air-oil hydraulic shock absorber used on aircraft landing gear. In certain embodiments, oleo strut 100 includes an inner cylinder 140 mechanically coupled to a wheel axle (not shown), and an outer cylinder 145 mechanically coupled with an airframe (not shown). Inner and outer cylinders 140, 145 are for example metal tubes or pistons (sometimes referred to as barrels) that are concentrically aligned with one another such that inner cylinder 140 is adapted for sliding within outer cylinder 145 in a longitudinal direction. Outer cylinder 145 provides a first chamber 171 and inner cylinder 140 provides a second chamber 172 for containing a hydraulic fluid (e.g., a non-compressible fluid such as a mineral oil). In certain embodiments, the entire internal volume of outer cylinder 145 and inner cylinder 140 form the first and second chambers 171, 172. However, first and second chambers 171, 172 may have any configuration within outer and inner cylinders 145, 140 so long as they provide the desired functionality of containing hydraulic fluid, unless otherwise specified in the claims.

Controlling resistance to flow of the hydraulic fluid between inner and outer cylinders 140, 145 may be used to modulate damping of movement of inner cylinder 140 with respect to outer cylinder 145. Inner cylinder 140 may further include additional paths for transferring hydraulic fluid with portions of outer cylinder 145. For example, as depicted in FIGS. 1 and 2, one or more holes 142 may be provided in inner cylinder 140 for enabling fluid flow into a compartment 143 of outer cylinder 145. In certain embodiments, flow of fluid into compartment 143 may be used to provide additional damping, especially during the extension phase.

Figure 3:
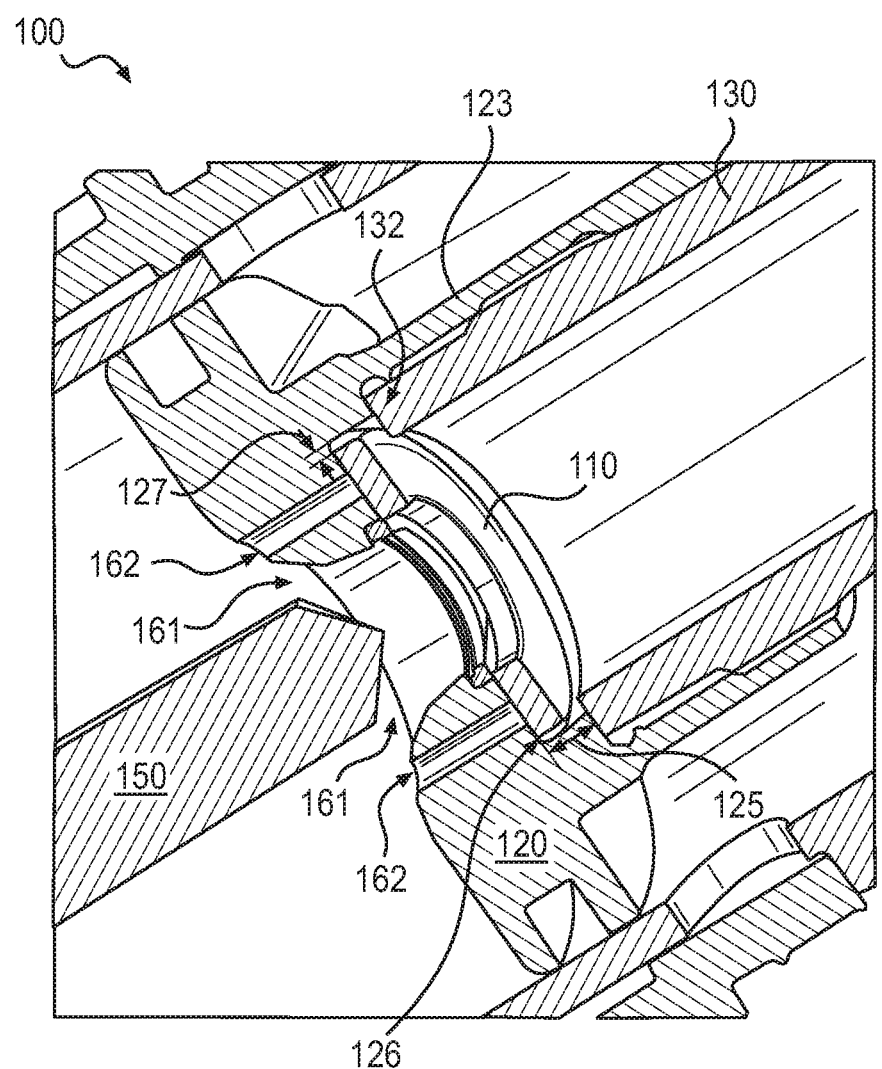
FIG. 3 is a close-up cross-sectional side view along a mid-section of a free-floating washer, in an embodiment.

As depicted in FIGS. 1-3, an orifice plate 120 separates the hydraulic fluid chambers of inner cylinder 140 and outer cylinder 145 and includes a plate having a plurality of holes to provide one or more corresponding paths for transfer of hydraulic fluid between inner cylinder 140 and outer cylinder 145. In other words, the plurality of holes enable fluid coupling between first chamber 171 and second chamber 172 of outer cylinder 145 and inner cylinder 140, respectively. In certain embodiments, orifice plate 120 is aligned in a transverse direction, which is perpendicular to the longitudinal direction in which inner and outer cylinders 140, 145 move with respect to one another. When oleo strut 100 compresses or extends, hydraulic fluid is forced from one chamber to the other through the plurality of holes of orifice plate 120. The resistance to this flow creates a damping force that is affected by a flow area of the plurality of holes and by other characteristics of the flow. Features of oleo strut 100 that may also affect the damping force include, but are not limited to, a shape of the orifices, a path length of the orifices, whether or not the outlet flow path of the orifice is clear or partially obstructed, the viscosity/temperature of the fluid, and the surface roughness of the orifices.

In certain embodiments, as depicted in FIGS. 1-3, a support tube 130 is positioned concentrically within outer cylinder 145 and extends partially into inner cylinder 140 in the longitudinal direction for supporting orifice plate 120. Support tube 130 is for example a pipe, standpipe, or other member that is rigidly connected to the airframe at a first end (not shown). A second end 132 of support tube 130 is mechanically coupled to orifice plate 120 via a connecting portion 123 of plate 120. For example, the second end 132 and the connecting portion 123 may both be threaded to enable a threaded coupling therebetween. A seal 121 seals the outer portion of orifice plate 120 with the inner diameter of inner cylinder 140 for preventing flow of hydraulic fluid while allowing sliding of inner cylinder 140 with respect to orifice plate 120. In other words, orifice plate 120 is slidably inserted into inner cylinder 140. In an embodiment, seal 121 is a piston ring.

A metering pin 150 is mechanically coupled to a first end 141 of inner cylinder 140 via a bracket 144, extends longitudinally along a central axis within inner cylinder 140, and passes through a central port of orifice plate 120 and into support tube 130. The central port provides a hole through the center of orifice plate 120 that not only allows passage of metering pin 150 but is also sized to provide a primary fluid path 161 around metering pin 150 for hydraulic fluid to flow between inner cylinder 140 and outer cylinder 145. A fluid flow 160 occurs in a direction from inner cylinder 140 to outer cylinder 145 during a compression phase of oleo strut 100, as depicted in FIG. 1. A secondary fluid path 162 through orifice plate 120 is also provided, as further described below.

Free-floating washer 110 is disposed adjacent orifice plate 120 and around metering pin 150. In certain embodiments, free-floating washer 110 is a circular plate with a circular hole through the middle. An inner diameter of the circular hole through washer 110 is sized to allow fluid to flow through primary fluid path 161 between inner and outer cylinders 140, 145. An outer diameter of washer 110 is sized sufficiently wide to cover one or more holes of secondary fluid path 162.

In some embodiments, orifice plate 120 includes a seat 126 adapted to receive washer 110. Seat 126 is for example a cutaway or inset portion of orifice plate 120 having a diameter slightly larger than an outer diameter of washer 110 and having a depth larger than a thickness of washer 110 (see also FIG. 3 and related description). In certain embodiments, a second end 132 of support tube 130 constrains washer 110 above seat 126 of orifice plate 120. Therefore, in some embodiments, a slot 125 (see FIG. 3) is formed between the second end 132 of support tube 130 and an open side of seat 126 of orifice plate 120. Slot 125 is sized to allow washer 110 to move freely within a defined longitudinal and transverse range, and also to freely rotate within seat 126 without binding.

Washer 110 will move in the longitudinal direction towards orifice plate 120 or support tube 130 based on differential pressure of the hydraulic fluid. Washer 110 is constrained within slot 125 such that movement of washer 110 is limited to ensure that no adverse positions or orientations may be obtained that could cause binding (see also FIG. 3 and related description below). A width of washer 110 between its outer edge and its inner circular hole is wide enough to cover the one or more holes of secondary fluid path 162 despite any transverse movement of washer 110 within seat 126. A thickness of washer 110 is sufficient for the washer to withstand differential pressure and maintain its dimensions, while moving and without binding.

The rate of oleo strut stroke, whether during compression or extension, is directly proportional to the rate that hydraulic fluid passes through orifice plate 120. The flow area and other flow characteristics determine the resistance to flow and the resulting damping force of oleo strut 100. The flow area and flow characteristics are modified based on the position of free-floating washer 110, as described below.

Free-floating washer 110 covers secondary path 162 when in contact with orifice plate 120 (as depicted in FIG. 2) and allows flow through secondary path 162 when in contact with support tube 130 (as depicted in FIG. 1). During oleo strut compression, hydraulic fluid pressure through secondary fluid path 162 pushes free-floating washer 110 away from orifice plate 120, as depicted in FIG. 1. Secondary fluid path 162 includes one or more holes through orifice plate 120 in addition to primary fluid path 161. In the embodiments depicted in FIGS. 1-3, secondary fluid path 162 includes two holes through orifice plate 120, but a fewer or greater number of holes could be used without departing from the scope hereof. During oleo strut 100 compression when free-floating washer 110 is pushed away from orifice plate 120, secondary fluid path 162 is opened which increases the overall flow area for hydraulic fluid to flow from inner cylinder 140 to outer cylinder 145. In other words, opening of secondary fluid path 162 increases the open passage area of orifice plate 120 which reduces the resistance of hydraulic fluid flow.

FIG. 2 is a cross-sectional side view along a mid-section of oleo strut 100 during an extension phase. Items enumerated with like numerals from FIG. 1 are the same and their description may not be repeated accordingly. During extension of oleo strut 100, the flow of hydraulic fluid is in the opposite direction compared to that of the compression phase of FIG. 1. The pressure created on the opposite side of washer 110 (e.g., a top side of washer 110 as depicted in FIG. 2) forces washer 110 against orifice plate 120, which limits flow 160 to primary path 161 while closing off secondary path 162. The reduction in flow area through orifice plate 120 increases resistance to flow thereby increasing the damping force and reducing the extension rate of oleo strut 100 compared to the compression phase.

FIG. 3 is a close-up cross-sectional side view along a mid-section of oleo strut 100 showing free-floating washer 110 between orifice plate 120 and support tube 130. Items enumerated with like numerals from FIG. 1 are the same and their description may not be repeated accordingly. As depicted in FIG. 3, washer 110 is adjacent orifice plate 120 for blocking secondary flow path 162, which occurs during the extension phase of oleo strut 100. As depicted in FIG. 3, metering pin 150 is withdrawn from primary flow path 161 to enable viewing of components of oleo strut 100. Metering pin 150 withdraws from primary flow path 161 in some embodiments when oleo strut 100 is fully extended, as shown in FIG. 3; however, in other embodiments (e.g., FIG. 4) the metering pin does not withdraw from the primary flow path.

Slot 125 enables translation of washer 110 along the longitudinal axis of oleo strut 100. A gap 127 enables small movement of washer 110 along a transverse axis of oleo strut 100, perpendicular to the longitudinal axis. Free-floating washer 110 is constrained within slot 125 to enable movement for blocking or unblocking secondary path 162 while avoiding potential binding. An outer diameter of washer 110 is less than an inner diameter of seat 126 in orifice plate 120 adapted to receive washer 110, which provides gap 127.

Gap 127 ensures that washer 110 is not constrained to slide against any surface when moving in the longitudinal direction, thereby avoiding friction and potential binding. However, washer 110 has an outer diameter that is sufficiently wide to enable contact with support tube 130 when moved away from orifice plate 120 for all possible positions and orientations of washer 110. In addition, gap 127 is adapted to limit transverse movement of washer 110 for preventing washer 110 from covering any portion of primary fluid path 161 while maintaining the capability to block secondary fluid path 162. Likewise, an inner diameter of washer 110 is large enough to avoid blocking primary fluid path 161 and small enough to maintain the capability to block secondary path 162. In other words, washer 110, as disposed between the second end 132 of support tube 130 and orifice plate 120, partially covers the plurality of holes in orifice plate 120 when oleo strut 100 is extending, but not when oleo strut 100 is compressing.

Figure 4:
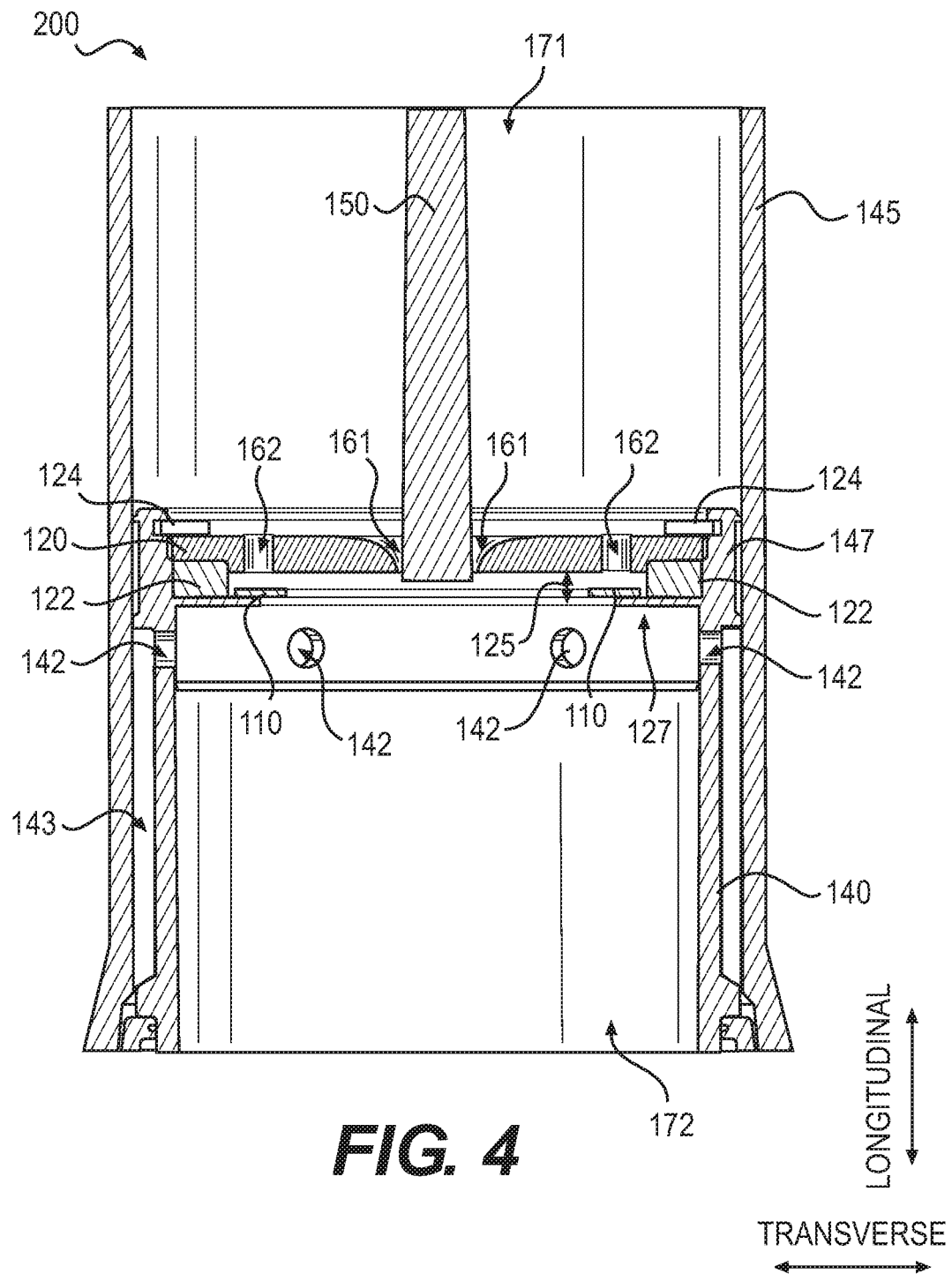
FIG. 4 is a cross-sectional side view along a mid-section of another embodiment of an oleo strut having a free-floating washer.

FIG. 4 is a cross-sectional side view showing one half of an exemplary oleo strut 200 at a mid-section. Items enumerated with like numerals from FIG. 1 are the same or similar and their description may not be repeated accordingly. In oleo strut 200, orifice plate 120 is held in place without support tube 130 as in oleo strut 100, FIG. 1. Orifice plate 120 of oleo strut 200 includes a primary fluid path 161 and a secondary fluid path 162, similar to oleo strut 100, FIG. 1. Orifice plate 120 is secured between a bracket 122 and a retaining ring 124. Bracket 122 and orifice plate 120 are coupled to an upper portion 147 of inner cylinder 140 and retaining ring 124 is held within a groove of upper portion 147. Bracket 122 and retaining ring 124 include a large central hole to permit passage of hydraulic fluid and metering pin 150.

Bracket 122 and orifice plate 120 are adapted to form slot 125 that is wider than a thickness of washer 110 to enable longitudinal movement of washer 110 due to hydraulic fluid flow. For example, floating washer 110 is constrained between bracket 122 and orifice plate 120 with sufficient space to enable upward movement of washer 110 when hydraulic fluid is moving upward (e.g., during extension of oleo 200), thereby closing one or more holes of secondary fluid path 162. Gap 127 along the outer diameter of washer 110 ensures that washer 110 is not constrained to slide against any surface when moving in the longitudinal direction, thereby avoiding friction and potential binding.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A rebound damping system for an oleo strut, comprising:
    an outer cylinder forming a first fluid chamber;
    an inner cylinder forming a second fluid chamber, the inner cylinder adapted for sliding concentrically within the outer cylinder in a longitudinal direction;
    an orifice plate located within the inner cylinder and arranged in a transverse direction perpendicular with the longitudinal direction, the orifice plate providing a fluid path for fluidly coupling the first fluid chamber with the second fluid chamber;
    a free-floating washer positioned adjacent the orifice plate such that during extension of the oleo strut, fluid flow pushes the free-floating washer against the orifice plate thereby covering a portion of the fluid path to prevent fluid flow for increased damping, and during compression of the oleo strut, fluid pushes the free-floating washer away from the orifice plate allowing fluid flow through the fluid path;
    the orifice plate comprises a seat adapted to receive the free-floating washer, the seat having a diameter slightly larger than an outer diameter of the washer and a depth larger than a thickness of the washer; and
    one or more holes provided in the inner cylinder for enabling fluid flow to enter into a compartment of the outer cylinder, wherein the one or more holes in the inner cylinder and the compartment of the outer cylinder are adapted to provide additional damping via fluid flow into the compartment.

2. The rebound damping system of claim 1, wherein, during extension of the oleo strut, the free-floating washer provides an additional damping force, thereby reducing an extension speed of the oleo strut.

3. The rebound damping system of claim 1, wherein the free-floating washer has a circular hole through the middle with an inner diameter adapted to allow fluid flow through a primary fluid path.

4. The rebound damping system of claim 1, wherein the free-floating washer has an outer diameter adapted to cover one or more of the plurality of holes of a secondary fluid path.

5. The rebound damping system of claim 1, further comprising a support tube positioned concentrically within the outer cylinder and extending partially into the inner cylinder in the longitudinal direction, the support tube having a first end and a second end, the first end being mechanically coupled to an external structure, and the second end being mechanically coupled to the orifice plate for supporting the orifice plate within the inner cylinder.

6. The rebound damping system of claim 3, wherein the second end of support tube constrains the free-floating washer above an open side of the seat such that a slot is formed between the second end of the support tube and the orifice plate, the slot being adapted to enable translation of the washer in the longitudinal direction for alternatively blocking and unblocking a secondary fluid path to control fluid flow through the orifice plate while preventing binding of the washer.

7. The rebound damping system of claim 6, wherein the outer diameter of the free-floating washer is smaller than an inner diameter of the seat of the orifice plate forming a gap between the washer and the seat, the gap being adapted to enable small movement of the washer in the transverse direction while ensuring that the washer is not constrained to slide against any surface when moving in the longitudinal direction to avoid friction and binding.

8. The rebound damping system of claim 7, wherein the gap is adapted to limit transverse movement of the free-floating washer to prevent covering any portion of the primary fluid path while maintaining the capability to block the secondary fluid path.

9. The rebound damping system of claim 1, wherein the fluid path of the orifice plate comprises a primary fluid path having at least one hole through the orifice plate and a secondary fluid path having a plurality of holes through the orifice plate.

10. The rebound damping system of claim 9, wherein the free-floating washer is adapted to cover at least a portion of the plurality of holes of the secondary fluid path during extension of the oleo strut while allowing the primary fluid path to remain open to fluid flow; and, the free-floating washer is adapted to uncover the secondary fluid path during compression of the oleo strut, thereby increasing the open passage area of the orifice plate for reducing resistance to fluid flow.

11. An oleo strut having a free-floating washer for rebound damping, comprising:
an outer cylinder forming a first fluid chamber and mechanically coupled to an airframe of an aircraft;
an inner cylinder forming a second fluid chamber, the inner cylinder adapted for sliding concentrically within the outer cylinder in a longitudinal direction;
an orifice plate located within the inner cylinder and arranged in a transverse direction, the orifice plate having a plurality of holes for fluidly coupling the first fluid chamber with the second fluid chamber;

the free-floating washer is positioned adjacent the orifice plate for partially covering the plurality of holes due to fluid flow when the oleo strut is extending; and
wherein the orifice plate is secured between a bracket and a retaining ring, the orifice plate and the bracket being coupled to an upper portion of the inner cylinder, the retaining ring being held within a groove of the upper portion, and the bracket and the retaining ring each having a central hole to permit passage of hydraulic fluid and a metering pin.

12. The free-floating washer of claim 11, further comprising a support tube positioned concentrically within the outer cylinder and extending partially into the inner cylinder in the longitudinal direction, the support tube having a first end and a second end, the first end being mechanically coupled to the airframe, and the second end being mechanically coupled to the orifice plate for supporting the orifice plate within the inner cylinder.

13. The free-floating washer of claim 11, wherein the orifice plate comprises a seat for receiving the free-floating washer adjacent the plurality of holes.

14. The free-floating washer of claim 13, wherein the second end of the support tube constrains the free-floating washer from an open side of the seat such that a slot is formed between the second end of the support tube and the orifice plate.

15. The free-floating washer of claim 14, wherein the slot is adapted to enable movement of the free-floating washer for alternatively blocking and unblocking at least a portion of the plurality of holes in the orifice plate.

16. The free-floating washer of claim 11, wherein the bracket and the orifice plate are adapted to form a slot adapted to enable movement of the free-floating washer for alternatively blocking and unblocking at least a portion of the plurality of holes in the orifice plate.

17. A rebound damping system for an oleo strut, comprising:
an outer cylinder forming a first fluid chamber;
an inner cylinder forming a second fluid chamber, the inner cylinder adapted for sliding concentrically within the outer cylinder in a longitudinal direction;
an orifice plate located within the inner cylinder and arranged in a transverse direction perpendicular with the longitudinal direction, the orifice plate providing a fluid path for fluidly coupling the first fluid chamber with the second fluid chamber;
a support tube positioned concentrically within the outer cylinder and extending partially into the inner cylinder in the longitudinal direction, the support tube having a first end and a second end, the first end being mechanically coupled to an external structure, and the second end being mechanically coupled to the orifice plate for supporting the orifice plate within the inner cylinder;
a free-floating washer positioned adjacent the orifice plate such that during extension of the oleo strut, fluid flow pushes the free-floating washer against the orifice plate thereby covering a portion of the fluid path to prevent fluid flow for increased damping, and during compression of the oleo strut, fluid pushes the free-floating washer away from the orifice plate allowing fluid flow through the fluid path;
wherein the fluid path of the orifice plate comprises a primary fluid path having at least one hole through the orifice plate and a secondary fluid path having a plurality of holes through the orifice plate;
a metering pin mechanically coupled to a first end of the inner cylinder via a bracket, wherein the metering pin extends longitudinally along a central axis within the inner cylinder and passes through a central port of the orifice plate and into the support tube; and wherein the central port provides a hole through the orifice plate that allows passage of the metering pin and is also sized to provide the primary fluid path around the metering pin for hydraulic fluid to flow between the inner cylinder and the outer cylinder.

\* \* \* \* \*